US008906507B2

(12) United States Patent
Campbell et al.

(10) Patent No.: US 8,906,507 B2
(45) Date of Patent: Dec. 9, 2014

(54) COATING SYSTEM FOR ACHIEVING EXCELLENT MVSS ADHESION

(75) Inventors: Donald H. Campbell, Hartland, MI (US); Gregory G. Menovcik, Northville, MI (US); David J. Santure, Novi, MI (US); Walter H. Ohrbom, Hartland Township, MI (US); Donald St. Aubin, Pleasant Ridge, MI (US); Paul J. Harris, Tega Cay, SC (US)

(73) Assignee: BASF Corporation, Florham Park, NJ (US)

( * ) Notice: Subject to any disclaimer, the term of this patent is extended or adjusted under 35 U.S.C. 154(b) by 1284 days.

(21) Appl. No.: 12/516,836

(22) PCT Filed: Feb. 13, 2008

(86) PCT No.: PCT/US2008/001920
§ 371 (c)(1),
(2), (4) Date: Mar. 8, 2010

(87) PCT Pub. No.: WO2008/100548
PCT Pub. Date: Aug. 21, 2008

(65) Prior Publication Data
US 2010/0183882 A1    Jul. 22, 2010

Related U.S. Application Data

(60) Provisional application No. 60/895,492, filed on Mar. 19, 2007, provisional application No. 60/889,577, filed on Feb. 13, 2007.

(51) Int. Cl.
*B32B 27/08* (2006.01)
*B32B 27/40* (2006.01)
*C08G 18/00* (2006.01)
*B05D 7/00* (2006.01)
*C09D 201/02* (2006.01)

(52) U.S. Cl.
CPC ............ *B05D 7/576* (2013.01); *C09D 201/025* (2013.01); *B05D 2202/15* (2013.01)
USPC ...................................................... 428/423.1

(58) Field of Classification Search
None
See application file for complete search history.

(56) References Cited

U.S. PATENT DOCUMENTS

| | | | |
|---|---|---|---|
| 5,356,669 A | 10/1994 | Rehfuss et al. | |
| 5,639,821 A | 6/1997 | Kranig et al. | |
| 5,639,828 A | 6/1997 | Briggs et al. | |
| 5,726,274 A | 3/1998 | Menovcik et al. | |
| 5,814,410 A | 9/1998 | Singer et al. | |
| 5,976,615 A * | 11/1999 | Menovcik et al. | 427/140 |
| 5,989,642 A | 11/1999 | Singer et al. | |
| 6,103,816 A | 8/2000 | Swarup et al. | |
| 6,106,951 A | 8/2000 | Ohrbom et al. | |
| 6,331,596 B1 | 12/2001 | Ramesh et al. | |
| 6,380,323 B1 | 4/2002 | December | |
| 6,531,560 B1 | 3/2003 | Campbell et al. | |
| 6,624,279 B2 | 9/2003 | Ohrbom et al. | |
| 6,696,159 B2 | 2/2004 | Champbell et al. | |
| 6,696,535 B2 | 2/2004 | Campbell et al. | |
| 6,855,789 B2 | 2/2005 | Campbell et al. | |
| 6,858,693 B2 | 2/2005 | Campbell et al. | |
| 2003/0171519 A1 | 9/2003 | Campbell et al. | |
| 2003/0171520 A1 | 9/2003 | Campbell et al. | |
| 2003/0171521 A1 | 9/2003 | Campbell et al. | |
| 2003/0176617 A1 * | 9/2003 | Shen | 528/44 |
| 2003/0236341 A1 | 12/2003 | Campbell et al. | |
| 2004/0063850 A1 * | 4/2004 | Ohrbom et al. | 524/556 |
| 2005/0074617 A1 | 4/2005 | Lin et al. | |
| 2006/0046068 A1 * | 3/2006 | Barancyk et al. | 428/423.1 |
| 2006/0047036 A1 | 3/2006 | Lin | |
| 2006/0128901 A1 * | 6/2006 | Ramesh et al. | 525/327.6 |

FOREIGN PATENT DOCUMENTS

| | | |
|---|---|---|
| EP | 0890624 A1 | 1/1999 |
| WO | WO 0055229 A1 | 9/2000 |
| WO | WO 0055231 A1 | 9/2000 |
| WO | WO 03011992 A2 | 2/2003 |
| WO | WO 03011986 A1 | 3/2003 |
| WO | WO 2005033233 A2 | 4/2005 |
| WO | WO 2005046889 A1 | 5/2005 |
| WO | WO 2007008635 A1 | 1/2007 |

OTHER PUBLICATIONS

Hamerton, Developments in Epoxy Resins—p. 32, Rapra Review Reports, vol. 8, No. 7, 1996.*
PCT International Search Report for PCT/US2008/001920, dated Jun. 6, 2008, 4 pages.

* cited by examiner

*Primary Examiner* — Callie Shosho
*Assistant Examiner* — Coris Fung
(74) *Attorney, Agent, or Firm* — Howard & Howard Attorneys PLLC

(57) ABSTRACT

A coating system includes a clear coat layer and a sealant. The clear coat layer is formed from a clear coat composition that comprises a crosslinkable carbamate-functional resin and an aminoplast. Optionally, the coating system further includes a sub-clear coat layer. The sealant is bonded to the clear coat layer opposite the sub-clear coat layer. Optionally, the coating system further includes a tie coat layer and that is disposed between the sealant and the clear coat layer. An adhesion promoter is present in the clear coat composition in an amount of less than or equal to about 3% by weight based on the total weight of resin solids of the clear coat composition. Further, the adhesion promoter is present in at least one of the sub-clear coat composition and the tie coat composition in an amount sufficient to increase adhesion between the clear coat layer and the sealant.

23 Claims, No Drawings

COATING SYSTEM FOR ACHIEVING EXCELLENT MVSS ADHESION

RELATED APPLICATIONS

This application claims priority to and all the advantages of International Patent Application No. PCT/US2008/001920, filed on Feb. 13, 2008, which claims priority to U.S. Provisional Patent Application No. 60/895,492 filed on Mar. 19, 2007 and U.S. Provisional Patent Application No. 60/889,577 filed Feb. 13, 2007.

BACKGROUND OF THE INVENTION

1. Field of the Invention

The present invention generally relates to a coating system including a clear coat layer and a sealant. More specifically, the present invention relates to a coating system that is modified to enable threshold adhesion strength to be achieved between glass and a substrate bonded through the coating system without affecting appearance of the clear coat layer even in the event of below-specification film builds of the clear coat layer in the coating system.

2. Description of the Related Art

Bonding of stationary glass, such as a windshield, to a vehicle body during a vehicle assembly process presents many quality and safety issues to automotive manufacturers. For example, motor vehicle safety standards (MVSS), such as MVSS 212, require a threshold adhesion strength between glass and vehicle bodies for ensuring that the glass remains bonded to the vehicle body, especially in the event of a crash or rollover situation, to minimize the incidence of injury to passengers of the vehicle resulting from detachment of the glass from the vehicle body. In fact, in crash and roll-over situations, the glass may provide additional support to a roof of the vehicle and may thereby help to prevent injuries resulting from compaction of the roof of the vehicle. Therefore, the glass preferably remains bonded to the vehicle body.

During the vehicle assembly process, a coating system is formed on the vehicle body prior to the point in the process at which the glass is bonded to the vehicle body. The coating system typically includes a clear coat layer, a base coat layer, and other sub-clear coat layers that are known in the art. The glass is bonded to the coating system of the vehicle body via a sealant that is typically applied in the form of a bead to the clear coat layer. Thus, the adhesion strength between the glass and the vehicle body is dependent upon the interaction between the sealant and the clear coat layer within the coating system.

Many factors may contribute to the robustness of the bond between the glass and the vehicle body, including the formulation of the sealant, the formulation of the clear coat layer, base coat layer, and other sub-clear coat layer(s) within the coating system on the vehicle body and inter-layer adhesion between those layers, compatibility of the formulations used for the sealant, the clear coat layer, the base coat layer, and the sub-clear coat layer(s) within the coating system, film build of the clear coat layer, the base coat layer, and other sub-clear coat layer(s) within the coating system, and the ability of the clear coat layer, base coat layer, and other sub-clear coat layer(s) in the coating system to cure at lower than normal times and temperatures.

While numerous methods of achieving the threshold adhesion strength have been used in the past, satisfaction of the adhesion strength thresholds has generally been accompanied by detrimental effects to the aesthetic qualities (e.g. appearance) and/or physical properties of the coating system or has required manual application of a reactive primer or a tape masking between the clear coat layer and the sealant.

Coating compositions that are used to form the clear coat layers are generally formulated based on a desire to achieve certain aesthetic qualities and/or physical properties in the resulting coating system, such as acceptable appearance, durability, resistance to scratching and degradation due to UV light, environmental etching, etc. For example, crosslinkable carbamate-functional polymers have been found to provide particularly desirable properties to the coating system in terms of resistance to environmental etching. Such crosslinkable carbamate-functional polymers are known in the art.

One strategy that has been used in the past to maximize the adhesion strength between the sealant and the coating system has been to modify the resin used to form the clear coat layer or to add additional additives into the resin to provide functional groups for reacting with the sealant. The resin is sensitive to modification or addition of additives, which usually negatively impacts one or more of the aesthetic qualities of the resulting clear coat layer. The effect of the additives or modifications on the resin is unpredictable and varies depending upon the type of resin. Further, when additives are used, automotive manufacturers require sufficiently high amounts of the additives to be added to the resin to enable threshold adhesion strength to be achieved even for below-specification film builds of the clear coat layer. The high amounts of the additive in the resin typically magnify the detrimental effects to the aesthetic qualities of the resulting clear coat layer. Automotive manufacturers also require that the resin used to form the clear coat layer be capable of "low temperature cure", or curing at lower than normal curing temperatures, to account for process variance without sacrificing aesthetic quality or safety performance of the coating system. Modification or the resin or addition of additives may affect the ability of the resin to satisfy the low temperature cure requirements, thereby possibly resulting in a higher incidence of below-specification coating systems.

With regard to the manual application of the reactive primer between the sealant and the clear coat layer, known reactive primers have reactive groups that react with the sealant and the clear coat layer, and much care must be taken to avoid application of the reactive primer onto the clear coat layer outside of specific regions on the vehicle body where the glass is to be bonded. Automated application of the reactive primer is generally not feasible, and laborers are typically required to apply the reactive primer, thus adding cost and time to the vehicle assembly process.

In view of the foregoing, there is a desire within the automotive and coatings industries to provide solutions to the problems associated with bonding stationary glass to coating systems, especially coating systems having a clear coat layer formed from carbamate-functional resins. More specifically, there is a desire to achieve threshold adhesion strength, in accordance with MVSS standards, between the glass and the vehicle bodies while accounting for below-specification film builds of the clear coat layer and low-temperature curing of the coating system, all while minimizing detrimental effects to the aesthetic qualities of the coating system.

SUMMARY OF THE INVENTION AND ADVANTAGES

The subject invention provides a coating system and a method of preparing the coating system. The coating system includes a clear coat layer and a sealant. The clear coat layer is formed from a clear coat composition that comprises a crosslinkable carbamate-based resin and an aminoplast. The aminoplast comprises the reaction product of an aldehyde and a melamine. Optionally, the coating system further includes a sub-clear coat layer that is formed from a sub-clear coat composition. The sub-clear coat composition comprises a sub-clear coat resin and a second crosslinking agent. The sealant is bonded to the clear coat layer opposite the sub-clear coat layer, when the sub-clear coat layer is present in the coating system. The sealant is formed from a sealant composition that comprises an isocyanate component and an isocyanate-reactive component. Optionally, the coating system further includes a tie coat layer that is formed from a tie coat composition and that is disposed between the sealant and the clear coat layer. An adhesion promoter is present in the clear coat composition in an amount of less than or equal to about 3% by weight based on the total weight of resin solids of the clear coat composition. Further, the adhesion promoter is present in at least one of the sub-clear coat composition and/or the tie coat composition, when the sub-clear coat layer and/or tie coat layer are present in the coating system, in an amount sufficient to increase adhesion between the clear coat layer and the sealant.

Increased adhesion strength can be achieved between the clear coat layer and the sealant when the adhesion promoter is included in at least one of the sub-clear coat composition and/or the tie coat composition, when the sub-clear coat layer and/or tie coat layer are present in the coating system, while minimal detrimental effects to the aesthetic qualities of the coating system are realized. In particular, by including the adhesion promoter in the sub-clear coat composition, and/or the tie coat composition, reduced amounts of the adhesion promoter may be included in the clear coat composition and, in many cases, the adhesion promoter can be omitted from the clear coat composition altogether while still achieving the increased adhesion strength between the clear coat layer and the sealant. As a result, any detriment to appearance of the clear coat layer due to including the adhesion promoter in the clear coat composition is minimized while the functional effects of the adhesion promoter are still obtained by including the adhesion promoter in the sub-clear coat composition, and/or the tie coat composition. Further, threshold adhesion strength, in accordance with MVSS standards, between the glass and the vehicle bodies can also be achieved through the coating system of the present invention while accounting for below-specification film builds of the clear coat layer and low-temperature curing of the coating system, all while minimizing detrimental effects to the aesthetic qualities of the clear coat layer in the coating system.

DETAILED DESCRIPTION OF THE INVENTION

The present invention provides a coating system including a clear coat layer, optionally a sub-clear coat layer disposed adjacent to the clear coat layer, a sealant bonded to the clear coat layer, and optionally a tie coat layer disposed between the clear coat layer and the sealant. When the optional sub-clear coat layer is present in the coating system, the sealant is bonded to the clear coat layer opposite to and spaced from the sub-clear coat layer. The coating system is useful for applications in which glass is bonded to a substrate, such as a vehicle body, through the coating system. More specifically, the coating system is useful in applications in which the glass is bonded to the substrate through the sealant that is included as part of the coating system. The coating system exhibits increased adhesion between the clear coat layer and the sealant, and makes it possible to achieve threshold adhesion strength, in accordance with MVSS 212, between the glass and the substrate bonded through the coating system under circumstances that, in other coating systems, may otherwise result in failure to achieve threshold adhesion strength. However, it is to be appreciated that the coating system of the present invention is useful in the coatings industry in general and is not limited to the specific application of bonding glass to substrates.

Sealants are well known in the art and may be used in the automotive industry to bond glass and other fixtures to a body of a vehicle through the coating system of the vehicle. The sealants are formed from a sealant composition that includes an isocyanate component and an isocyanate-reactive component. The "sealant", as used herein, refers to the bead, layer, or other configuration of the sealant composition once applied onto the clear coat layer, and the sealant composition in the sealant may be in an uncured, partially cured, or fully cured state. Ultimately, the sealant composition in the sealant is cured, in which case the sealant comprises the reaction product of the isocyanate component and the isocyanate-reactive component. The reaction between the isocyanate component and the isocyanate-reactive component is typically water-activated. For purposes of the present invention, any isocyanate known in the art for forming polyurethane, such as typical diisocyanates, is suitable for the isocyanate component of the sealant composition. Also for purposes of the present invention, the isocyanate-reactive component typically comprises a polyamine, i.e., a component having an average of at least 2 amine groups per molecule. Water is typically used to activate the reaction between the isocyanate component and the isocyanate-reactive component by reacting with the isocyanate component. The amount of water required for activation is typically provided by moisture in the ambient air surrounding the sealant; however, the water may be introduced through the isocyanate-reactive component or may be combined with the isocyanate component and/or the isocyanate-reactive component during reaction of the isocyanate component and the isocyanate-reactive component. The sealant may also include a silicon-containing component having a group represented by the formula Si—OR, where R is H, an alkyl group, or an ester group. A specific example of a sealant that is suitable for purposes of the present invention is Betaseal® 57302 urethane windshield adhesive commercially available from Dow Automotive.

The clear coat layer of the coating system is formed from a clear coat composition that comprises a crosslinkable carbamate-functional resin and an aminoplast. The "clear coat layer", as used herein, refers to the layer of the clear coat composition once applied onto the sub-clear coat layer or other substrate, and the clear coat composition present in the clear coat layer may be in an uncured, partially cured, or fully cured state. As with the sealant, the clear coat layer is ultimately cured, in which case the clear coat layer comprises the reaction product of the crosslinkable carbamate-functional resin and the aminoplast.

Crosslinkable carbamate-functional resins are known in the art and are especially useful to form clear coat layers in coating systems on vehicle bodies due to excellent physical properties that are provided by the crosslinkable carbamate-functional resins upon cure. The crosslinkable carbamate-functional resin typically comprises a crosslinkable carbamate-functional polymer; however, it is to be appreciated that other non-polymeric carbamate-functional molecules may also be included with or in place of the crosslinkable carbamate-functional polymer in the crosslinkable carbamate-functional resin. Additionally, other reactive functionality may be present in the clear coat composition, besides carbamate functionality, and the other reactive functionality may be introduced into the clear coat composition through materials other than the crosslinkable carbamate-functional resin or may be introduced as additional functional groups in the crosslinkable carbamate-functional resin. For example, crosslinkable resins other than the crosslinkable carbamate-functional resins, such as other film-forming active hydrogen-containing resins, can also be included in the clear coat composition in combination with the crosslinkable carbamate-functional resin. Film-forming active hydrogen-containing resins are known in the art and include hydroxyl-functional resins that are cured with a crosslinking agent to form a urethane link.

The clear coat composition may include any known formulation including a crosslinkable carbamate-functional resin, especially those known to be used for forming clear coat layers. Specific examples of suitable formulations including crosslinkable carbamate-functional resins include formulations disclosed in U.S. Pat. No. 5,356,669 to Rehfuss et al., U.S. Pat. No. 5,639,828 to Briggs et al., U.S. Pat. No. 5,814,410 to Singer et al., U.S. Pat. No. 5,976,615 to Menovcik et al., U.S. Pat. No. 5,989,642 to Singer et al., and U.S. Pat. No. 6,103,816 to Swarup et al., which are hereby incorporated by reference in their entirety.

The aminoplast in the clear coat composition reacts, i.e., crosslinks, with the crosslinkable carbamate-functional resin upon cure to form the clear coat layer. The aminoplast comprises the reaction product of an aldehyde and a melamine. Melamine, as known in the art, generally has the following structure:

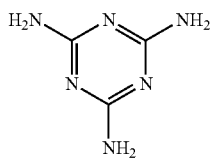

where each nitrogen-bonded hydrogen atom, i.e., imino group, represents a reaction site that is available for further reaction with functionality of other materials prior to or after reaction with the crosslinkable carbamate-functional resin. For example, as set forth above, the aminoplast comprises the reaction product of the aldehyde and the melamine. The aldehyde reacts with the aminoplast at an imino group to produce a nitrogen-bonded alkylol group pending from the triazine ring. The nitrogen-bonded alkylol groups may be further reacted with an alcohol to alkylate the nitrogen-bonded alkylol groups. Examples of suitable aldehydes, for purposes of the present invention, include those resulting in a $C_1$ to $C_8$ alcohol group bonded to a nitrogen atom pending from the triazene ring, which $C_1$ to $C_8$ alcohol group takes the place of a nitrogen-bonded hydrogen atom. Specific examples of suitable aldehydes include, but are not limited to, formaldehyde, acetaldehyde, propaldehyde, butyraldehyde, and combinations thereof. Other aminoplasts may comprise the reaction product of the aldehyde with an activated amine. The activated amines are amines connected to sp2 carbon atoms. Non-limiting examples of activated amines are amines connected to aromatic rings, such as benzene, melamine, and benzoguanamine; primary carbamates; urea; amides; vinyl amines; and combinations thereof. Examples of such aminoplasts include melamine-formaldehyde resins and urea formaldehyde resins.

It is to be appreciated that the clear coat composition may further comprise crosslinking agents other than the aminoplasts set forth above. Suitable "other" crosslinking agents that may be used, besides the aminoplast set forth above, include those having active hydrogen acceptor groups. Examples of other crosslinking agents that include the active hydrogen acceptor groups, for purposes of the present invention, include melamines, urea resins, polyanhydrides, phenol/formaldehyde adducts, polysiloxanes, and combinations thereof. When active hydrogen-containing resins are used in addition to the crosslinkable carbamate-functional resins, isocyanates and/or melamines may also be used as the "other" crosslinking agents for forming urethane bonds. The isocyanates may be blocked or unblocked. Additional detail with regard to "other" crosslinking agents that are suitable for purposes of the present invention are disclosed in U.S. Pat. No. 5,356,669 to Rehfuss et al., U.S. Pat. No. 5,639,828 to Briggs et al., U.S. Pat. No. 5,814,410 to Singer et al., U.S. Pat. No. 5,976,615 to Menovcik et al., U.S. Pat. No. 5,989,642 to Singer et al., and U.S. Pat. No. 6,103,816 to Swarup et al.

The clear coat layer formed from the clear coat composition includes at least some crosslinks resulting from carbamate cure with the aminoplast. Typically, urethane bonds resulting from carbamate cure with aminoplast are present in the clear coat layer in an amount of at least about 10%, alternatively from about 50% to about 100%, based on a total crosslink density in the clear coat layer. As such, the crosslinkable carbamate-functional resin and the aminoplast are typically present in the clear coat composition in an amount sufficient to produce urethane bonds resulting from carbamate cure with aminoplast in the amount of at least about 10%, alternatively from about 50% to about 100%, based on the total crosslink density in the clear coat layer. Those of skill in the art appreciate that actual amounts of the crosslinkable carbamate-functional resin and the aminoplast that are present in the clear coat composition, as a percentage of total weight of all components present in the clear coat composition (prior to crosslinking), may vary depending upon numbers of carbamate groups in the crosslinkable carbamate-functional resin, among other factors such as molecular weight of the crosslinkable carbamate-functional resin and the aminoplast. However, the crosslinkable carbamate-functional resin is typically present in an amount of at least about 10% by weight, alternatively from about 40% to about 90% by weight, based on the total weight of all components present in the clear coat composition. Further, the crosslinkable carbamate-functional resin is typically present in an amount of at least about 12% by weight, alternatively from about 50% to about 100% by weight based on the total amount of all crosslinkable resins present in the clear coat composition. Likewise, the aminoplast is typically present in an amount of at least about 10% by weight based on the total weight of all components present in the clear coat composition (prior to crosslinking with the resin). When the other crosslinking agents are present in the clear coat composition, the aminoplast is typically present in an amount of at least about 50% by weight, more typically from about 70% to about 100% by weight based on the total weight of all crosslinking agents present in the clear coat composition. It is to be appreciated that urethane bonds resulting from carbamate cure with the other crosslinking agents may form the balance of the crosslink density in the clear coat layer. Alternatively, other types of crosslinks, besides urethane resulting from carbamate cure with aminoplast, may form a portion of the crosslink density in the clear coat layer. Such "other" crosslinks may include urethane crosslinks resulting from hydroxyl cure with an isocyanate and/or melamine.

Preferably, the clear coat composition further comprises a component that includes one or more epoxide groups. The component including the epoxide group or groups is typically included with the other components that are present in the clear coat composition prior to formation of the clear coat layer and prior to curing. The component including the epoxide group essentially provides a protected hydroxyl group in the form of an epoxy ring, which becomes available for reaction upon opening of the ring. After the clear coat layer is formed, the protected hydroxyl group, made available upon ring-opening, is typically intended to provide a reaction site within the clear coat layer for reacting with isocyanate that is present in the sealant composition.

The component including the epoxide group typically reacts more slowly than the crosslinkable carbamate-functional resins, i.e., slower than the reaction between the crosslinkable carbamate-functional resin, any other crosslinkable resin, the aminoplast, and any other crosslinking agents that are present in the clear coat composition; however, it is to be appreciated that, in some circumstances, the component including the epoxide group may react with one or more of the crosslinkable carbamate-functional resin, any other crosslinkable resin, the aminoplast, and any other crosslinking agents that are present in the clear coat composition. Thus, although essentially any component including an epoxide group can be included in the clear coat composition of the present invention, the component including the epoxide group is preferably substantially free of groups that are reactive with any other component that is present in the clear coat composition. By "substantially free" of such groups, it is meant that the degree of reaction between the component including the epoxide group and any other component that is present in the clear coat composition is sufficiently low so as to avoid any undesired adverse impact on intercoat adhesion properties of the coating system. Undesired adverse impacts are typically avoided when the component including the epoxide group has an average of less than about 2 groups per molecule that are reactive with the crosslinkable carbamate-functional resin, the other crosslinkable resins, the specific aminoplast, or the other crosslinking agents that are present in the clear coat composition. Because the component including the epoxide group is typically intended to provide a reaction site within the clear coat layer for reacting with isocyanate that is present in the sealant composition, the component including the epoxide group preferably migrates within the clear coat layer and localizes near a surface of the clear coat layer. By minimizing or eliminating groups on the component including the epoxide that react directly with the crosslinkable carbamate-functional resin, the other crosslinkable resins, the specific aminoplast, or the other crosslinking agents that are present in the clear coat composition, this migration is allowed during the early stages of cure of the clear coat composition in the clear coat layer. Later during the cure of the clear coat composition in the clear coat layer, the epoxide groups typically react to form hydroxyl groups that may be available for reaction with the sealant composition. The component including the epoxide group may further include a fatty chain that promotes migration of the component including the epoxide group within the clear coat layer so that the component including the epoxide may localize near a surface of the clear coat layer. The fatty chain typically has from about 1 to about 25 carbon atoms present therein.

Components including the epoxide group that are suitable for purposes of the present invention are known in the art. The component including the epoxide group may be of the general formula:

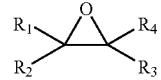

where $R_1$, $R_2$, $R_3$, and $R_4$ are each independently H, an organic radical, which may be polymeric or non-polymeric and may contain unsaturation and/or heteroatoms, or one of $R_1$ or $R_2$ together with one of $R_3$ or $R_4$ may form a cyclic ring, which may contain unsaturation and/or heteroatoms, with the proviso that at least one of $R_1$-$R_4$ is other than H. Useful components including the epoxide group can be prepared from alcohols, e.g., butanol or trimethylol propane, by reaction with an epihalohydrin (e.g., epichlorohydrin), or by reaction of an allyl group with peroxide. Oligomeric or polymeric polyepoxide groups, such as acrylic polymers or oligomers containing glycidyl methacrylate or epoxy-terminated polyglycidyl ethers such as the diglycidyl ether of bisphenol A (DGEBPA), can also be used. Epoxidized polyurethane resins or polyester resins can be prepared by reacting OH group-containing polyurethanes or polyesters, as are known in the art, with an epihalohydrin. Components including the epoxide group can also be prepared by reacting an isocyanate-terminated component such as a monomeric, polymeric, or oligomeric polyisocyanate with glycidol. Other known polyepoxide groups, e.g., epoxy-novolacs, may also be used. Especially suitable for purposes of the present invention are fatty glycidyl methacrylates, which include a fatty chain that enables the fatty glycidyl methacrylate to migrate within and localize at the surface of the clear coat layer. The component including the epoxide group is preferably used in amount of from about 0.0001 to about 0.05 equivalents of epoxy per 100 g of the crosslinkable carbamate-functional resin present in the clear coat composition.

As set forth above, the coating systems of the present invention may include one or more sub-clear coat layers such as a base coat layer, a primer layer, and/or any other sub-clear coat layer that is known in the art. Typically, the coating system includes more than one sub-clear coat layer. For example, the coating system may include both the base coat layer and the primer layer.

The sub-clear coat layer is formed from a sub-clear coat composition (or compositions if more than one sub-clear coat layer is present in the coating system). The sub-clear coat composition comprises a sub-clear coat resin and a second crosslinking agent. The "sub-clear coat layer", as used herein, refers to the layer of the sub-clear coat composition (or layers of sub-clear coat compositions) once applied onto the substrate, and the sub-clear coat composition present in the sub-clear coat layer may be in an uncured, partially cured, or fully cured state. As with the sealant and the clear coat layer, the sub-clear coat layer (or layers) is ultimately cured, in which case the sub-clear coat layer comprises the reaction product of the a sub-clear coat resin and a second crosslinking agent.

In one embodiment, when the sub-clear coat layer is the base coat layer, the sub-clear coat resin may comprise a base coat resin that is known for use in coatings systems where the clear coat composition includes the crosslinkable carbamate-functional resin. Further, when the sub-clear coat layer is the base coat layer, the second crosslinking agent typically includes the same specific aminoplast that is present in the clear coat composition. However, it is to be appreciated that the second crosslinking agent may include additional or different crosslinking agents. In addition to the base coat layer, the primer layer may be present as a second sub-clear coat layer. Alternatively, the base coat layer may be absent, in which case the primer layer may be the sub-clear coat layer. For coating systems including more than one sub-clear coat layer, the various sub-clear coat compositions used to form each sub-clear coat layer may be the same or different. Resins and crosslinking agents that are present in the sub-clear coating composition that are used to form the various sub-clear coat layers, such as base coat layers and primer layers, are known in the art.

Any sub-clear coat compositions known in the art to be suitable for forming base coat layers, primer layers, or other sub-clear coat layers, when crosslinkable carbamate-functional resins are present in the clear coat composition used to form the clear coat layer, may be used to form the base coat layer, primer layer, or other sub-clear coat layers in the coating system of the present invention. The compositions used to form the various layers within the coating system, including the clear coat layer, may be based on solvent-borne or water-borne chemistry, and may alternatively be applied in the form of a powder or a powder/slurry.

An adhesion promoter is used within the coating system to increase adhesion between the clear coat layer and the sealant, as compared to adhesion between the clear coat layer and the sealant when the adhesion promoter is not used. In particular, the adhesion promoter maximizes adhesion between the clear coat layer and the sealant in the absence of a reactive primer. Adhesion is typically measured in terms of a minimum thickness of the clear coat layer at which the sealant can no longer be manually pulled free from the clear coat layer. Additional detail with regard to testing of adhesion is provided below. A decrease of at least 0.1 mil in the thickness of the clear coat layer necessary to achieve adhesion, in accordance with the standard set forth above, is deemed to constitute an increase in the adhesion that is attributable to the adhesion promoter.

The adhesion promoter is selected from the group of an isocyanate hydrolysis retarder, an accelerator, and combinations thereof. Alternatively, the adhesion promoter may include an isocyanate hydrolysis retarder/accelerator complex, which is essentially a combination of the isocyanate hydrolysis retarder and the accelerator. While it is to be appreciated that the adhesion promoter may include only one of the isocyanate hydrolysis retard or the accelerator, exceptional results are obtained when the combination of the isocyanate hydrolysis retard and the accelerator are used as the adhesion promoter.

Suitable isocyanate hydrolysis retarders, for purposes of the present invention, include any material that is capable of slowing or retarding a reaction between isocyanate and water. Isocyanate hydrolysis retarders are known in the art. Examples of isocyanate hydrolysis retarders that are suitable for purposes of the present invention include phosphorus materials such as phosphate esters, benzoyl chloride, boric acid, nitrates, and certain tertiary amines that are known in the art as isocyanate hydrolysis retarders; however, it is to be appreciated that other isocyanate-hydrolysis retarders that are known in the art may also be used. Most preferred isocyanate hydrolysis retarders are the phosphorus materials.

The phosphorus material can be any member or a mixture of members of the following structures:

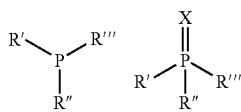

wherein R', R", and R'" are independently selected from the group of hydrocarbons, aromatic groups, hydrogen, or halides, and X is selected from the group of oxygen and sulfur. The hydrocarbons can have from 1 to 30 carbon atoms. R', R", and R'" may also include a heteroatom linking group and/or may include a linking group that is linked to the phosphorus atom. The linking group may be selected from the group of oxygen, sulfur, nitrogen, and related structures such as esters. In some cases, R', R", and R'" may be part of an oligomer and/or polymeric structure, or may be a derived from a component present in the coating system, such as a hydroxy acid. In some cases, the phosphorus material can be a material, such as diphosphorus decaoxide, that can form one of the above structures when introduced into a coating composition, such as a composition that is used to form the clear coat layer or the base coat layer. Likewise, there can be a ligand exchange that occurs in the coating composition either during curing or after curing of the coating composition. For example, a —OH ligand or a —OR ligand may be exchanged with an activated proton structure that is on a material/oligomer/polymer that is present in the coating composition.

Phosphate esters, such as acid phosphate esters, are especially preferred for purposes of the present invention. Acid phosphate esters are produced as the reaction product of hydroxyl containing compounds with phosphoric acid or its anhydride $P_2O_5$. The acid phosphate esters that are suitable for purposes of the present invention have the following characteristics: a pentavalent phosphorous atom, one phosphorous-oxygen double bond, 1 or 2 alkoxy or aryloxy groups, and one hydroxy group substituent. The acid phosphate esters have the following general formula:

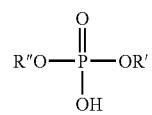

wherein R' and R" represent alkyl, aryl, aliphatic or cycloaliphatic groups. One of the groups R' or R" can be a hydrogen. Some typical examples of acid phosphate esters having the above formula include phosphoric acid monobutyl ester; phosphoric acid dibutyl ester; phosphoric acid monophenyl ester; phosphoric acid diphenyl ester; phosphoric acid 2-butoxy-1-ethyl ester; 2-ethylhexyl acid phosphate, cetyl acid phosphate, and stearyl acid phosphate. Particularly suitable acid phosphate esters of the present invention include alkyl phosphates having an alkyl group with a carbon chain length of from $C_4$ to $C_{12}$. Preferred acid phosphate esters of the present invention include, but are not limited to, butyl acid phosphate, 2-ethyl hexyl acid phosphate and acid phosphate esters containing aromatic groups such as phenyl acid phosphate. The acid phosphate ester may also be a mixture of esters represented by the formulation set forth herein above.

Suitable accelerators include any component that accelerates a reaction between isocyanate and hydroxyl functionality (i.e., the functionality present in the sealant composition). Suitable accelerators include Lewis acids, in particular those Lewis acids including a metal capable of jumping two oxidation states and a ligand that is an acid. Some examples of suitable metals that may be included in the Lewis acid include zinc, lithium, sodium, magnesium, barium, potassium, calcium, bismuth, cadmium, aluminum, zirconium, tin, hafnium, titanium, lanthanum, vanadium, niobium, tantalum, tellurium, molybdenum, tungsten and cesium. Examples of suitable ligands include diacetates, alkoxylates, and halides.

Specific examples of suitable accelerators for purposes of the present invention include those having the following general formula:

wherein Z is the ligand and n is 2 or more and is selected so that the valence around the tin is four. The accelerator can also be polymeric in nature, with some or all of the Z groups acting as bridging ligands between tin atoms.

In the various embodiments of the instant invention, the adhesion promoter is included in various compositions or in a combination of compositions that are used to form the respective layers within the coating system. Additionally, the adhesion promoter can be included in a tie coat composition. The tie coat composition is used to form a tie coat layer that is disposed between the sealant and the clear coat layer. In addition to the adhesion promoter, the tie coat composition may also include a solvent to aid in application of the tie coat composition onto the clear coat layer. The "tie coat layer", as used herein, refers to the layer of the tie coat composition once applied onto the clear coat layer, and the tie coat composition present in the tie coat layer may be in a dry or wet state. The tie coat layer is ultimately in a dry state, in which case any solvent in the tie coat composition is flashed or otherwise removed from the tie coat layer. The tie coat composition does not contain any components that crosslink with components in the clear coat composition or the sealant composition, thereby distinguishing the tie coat composition from reactive primers.

When the adhesion promoter includes only the isocyanate hydrolysis retarder or the accelerator, the adhesion promoter may be included in one of the compositions used to form the respective layers (subject to restrictions set forth below with regard to the amount of the adhesion promoter present in the clear coat composition), such as in any of the sub-clear coat compositions. Alternatively, the adhesion promoter may be included in a combination of the compositions used to form the respective layers, thereby providing the necessary amount of adhesion promoter into the coating system to result in increased adhesion between the sealant and the clear coat layer according to the standard set forth above. Further, it is to be appreciated that different adhesion promoters may be included in different compositions that are used to form the respective layers. For example, in one embodiment, the clear coat composition may include the isocyanate hydrolysis retarder as the adhesion promoter and the sub-clear coat composition, or the tie coat composition, may include the accelerator.

It is to be appreciated that when the adhesion promoter comprises a combination of the isocyanate hydrolysis retarder and the accelerator, the adhesion promoter may be included in one of the compositions used to form the respective layers or may be included in a combination of the compositions as set forth above. Further, when the adhesion promoter is the isocyanate hydrolysis retarder/accelerator complex, the complex may be formed prior to including on one or more of the compositions or may form when the isocyanate hydrolysis retarder and the accelerator are separately included in one of the compositions that are used to form the respective layers.

It is hypothesized that the adhesion promoter promotes excellent intercoat adhesion, especially during low-bake temperature repair of the coating system or during low temperature baking of the coating system, which may occur during initial formation of the coating system. One hypothesis for the mechanism by which the adhesion promoter promotes adhesion between the sealant and the clear coat layer is that the isocyanate hydrolysis retarder slows the reaction between isocyanate and water in the sealant, thereby providing the sealant composition more time to penetrate into the clear coat layer. It is hypothesized that the isocyanate hydrolysis retarder functions by forming an unstable complex with isocyanate groups in the isocyanate component present in the sealant composition, thereby allowing sufficient time for the sealant composition to penetrate into the clear coat layer. It is also hypothesized that slowing of the reaction between isocyanate and water in the sealant, coupled with the presence of the accelerator, promotes a competing reaction between the isocyanate in the sealant composition and hydroxyl groups within the clear coat composition, thereby promoting adhesion between the sealant and the clear coat layer. In particular, the hydroxyl groups in the clear coat composition may be the protected hydroxyl groups provided by the ring-opening reaction of the epoxide in the component including the epoxide, when the component including the epoxide is present in the clear coat composition, and it is hypothesized that the accelerator accelerates the ring-opening reaction of the epoxide.

Further, it has been observed that increased adhesion between the sealant and the clear coat layer occurs even when the adhesion promoter is included in one or more of the compositions that are used to form the other layers of the coating system other than the clear coat composition. For example, as alluded to above, the adhesion promoter may be included in the tie coat composition(s), and/or the sub-clear coat composition, such as the base coat composition, and it has surprisingly been found that the adhesion promoter is capable of migrating through the various layers of the coating system to localize near the interface between the clear coat layer and the sealant. As such, it is possible to minimize problems experienced in the prior art relative to modifying or mixing additives directly with the clear coat compositions that are used to form the clear coat layers of the prior art by including the adhesion promoter, or at least a substantial portion thereof, in one or more of the compositions that are used to form the other layers of the coating system. Further, by including the adhesion promoter outside of the clear coat composition, adhesion problems experienced as a result of insufficient film build of the clear coat layer can be avoided because a sufficient amount of the adhesion promoter may still be present in the overall coating system even at below-specification film builds of the clear coat layer. Thus, while it is to be appreciated that some of the adhesion promoter may be included in the clear coat composition, the balance of the adhesion promoter is introduced into the coating system through other compositions that are used to form the other layers of the coating system.

Therefore, in accordance with the instant invention, the adhesion promoter is present in the clear coat composition in an amount of less than or equal to 3% by weight, more typically less than or equal to 1% by weight, based on the total weight of resin solids of the clear coat composition. Most typically, the adhesion promoter is present in the clear coat composition in an amount of from about 0.2 to about 0.8% by weight based on the total weight of resin solids of the clear coat composition. In one embodiment, the adhesion promoter may be absent from the clear coat layer altogether. In terms of amounts of the isocyanate hydrolysis retarder and accelerator present in the clear coat composition, when the adhesion promoter is present in the clear coat composition, the isocyanate hydrolysis retarder is typically present in the clear coat composition in an amount of from about 0.01% to about 0.40% by weight, more typically from about 0.05% to about 0.20% by weight, based on a total weight of resin solids of the clear coat composition. The accelerator is typically present in the clear coat composition in an amount of from about 0.05% to about 0.8% by weight, more typically from about 0.15% to about 0.50% by weight, based on a total weight of resin solids of the clear coat composition. The above threshold amounts of the adhesion promoter in the clear coat composition, or the absence of the adhesion promoter in the clear coat composition, do not speak to the amount of adhesion promoter that may migrate into the clear coat layer from the sub-clear coat layer after the clear coat layer and sub-clear coat layer or layers are formed. By limiting the amount of the adhesion promoter that is present in the clear coat composition, problems experienced in the prior art relative to modifying or mixing additives directly into the clear coat compositions are minimized and migration of the adhesion promoter into the clear coat layer after formation of the clear coat layer does not affect appearance of the clear coat layer.

Likewise, the adhesion promoter is present in at least one of the sub-clear coat composition and the tie coat composition, in an amount that is sufficient to increase adhesion between the clear coat layer and the sealant. As set forth above, the adhesion promoter can be included in any combination of the sub-clear coat composition or compositions and/or the tie coat composition so long as sufficient adhesion promoter is included in one or more of those compositions to increase adhesion between the sealant and the clear coat layer.

As to inclusion of the adhesion promoter in the sub-clear coat composition or compositions, it is to be appreciated that the subject sub-clear coat composition may be the base coat composition or the primer composition. It is also to be appreciated that, when both the base coat layer and the primer layer are present, the adhesion promoter may be present in both the base coat composition and the primer composition. While it is to be appreciated that the actual amount of the adhesion promoter that is present in the sub-clear coat composition may vary depending upon the specific isocyanate hydrolysis retarder and/or accelerator that is used, the adhesion promoter is typically present in the sub-clear coat composition or compositions in an amount of at least about 0.05% by weight, more typically from about 0.05% to about 1.5% by weight, most typically from about 0.10% to about 0.25% by weight, based on a total weight of resin solids of the compositions used to form the respective sub-clear coat layers. In terms of amounts of the isocyanate hydrolysis retarder and accelerator, the isocyanate hydrolysis retarder is typically present in the sub-clear coat composition or compositions in an amount of at least 0.01% by weight, more typically from about 0.04% to about 1% by weight, most typically from about 0.04% to about 0.10% by weight, based on a total weight of resin solids of the respective sub-clear coat compositions. The accelerator is typically present in the sub-clear coat composition or compositions in an amount of at least 0.01% by weight, more typically from about 0.02% to about 1% by weight, most typically from about 0.04% to about 0.12% by weight, based on a total weight of resin solids of the respective sub-clear coat compositions. Alternatively, when the complex is used, the complex is typically used in amounts equal to the combined isocyanate hydrolysis retarder and accelerator. Of course, it is to be appreciated that the ideal amount of the actual isocyanate hydrolysis retarders or accelerators is dependent upon the specific type of isocyanate hydrolysis retarder or accelerator.

When the coating system includes the tie coat layer formed from the tie coat composition, it is to be appreciated that the actual amount of the adhesion promoter that is present in the tie coat composition may vary depending upon the specific isocyanate hydrolysis retarder and/or accelerator that is used. Nonetheless, the adhesion promoter is typically present in the tie coat composition in an amount of at least about 0.05% by weight, more typically from about 0.1% to about 50% by weight, most typically from about 1% to about 25% by weight, based on a total weight of all components present in the tie coat composition. In terms of amounts of the isocyanate hydrolysis retarder and accelerator, the isocyanate hydrolysis retarder is typically present in the tie coat composition in an amount of at least 0.02% by weight, more typically from about 0.05% to about 30% by weight, most typically from about 1% to about 20% by weight, based on a total weight of all components present in the tie coat composition. The accelerator is typically present in the tie coat composition in an amount of at least 0.03% by weight, more typically from about 0.05% to about 30% by weight, most typically from about 1% to about 25% by weight, based on a total weight of all components present in the tie coat composition.

It is to be appreciated that when the adhesion promoter is introduced into the coating system through a combination of the sub-clear coat composition or compositions, and/or the tie coat composition, the relative amounts of the adhesion promoter (including individual amounts of the isocyanate hydrolysis retarder and the accelerator) present in each composition may be varied according to the amount ranges set forth above in the context of suitable amounts when the adhesion promoter is only included in one of the compositions.

In one specific embodiment of the instant invention, the isocyanate hydrolysis retarder is butyl acid phosphate and the accelerator is the Lewis acid. In this embodiment, the butyl acid phosphate is present in at least one of the sub-clear coat composition or compositions, and/or the tie coat composition. Typically, the butyl acid phosphate is included in the base coat composition, and the butyl acid phosphate is present in an amount of from about 0.05% to about 0.10% by weight based on the total weight of resin solids of the base coat composition. Likewise, the Lewis acid is present in at least one of the sub-clear coat composition or compositions and/or the tie coat composition. As with the butyl acid phosphate, the Lewis acid is also typically included in the base coat composition, and the Lewis acid is present in an amount of from about 0.01% to about 0.15% by weight based on a total weight of resin solids of the base coat composition. In another specific embodiment, the isocyanate hydrolysis retarder is phenyl acid phosphate and the accelerator is the Lewis acid. In this embodiment, the phenyl acid phosphate is present in at least one of the sub-clear coat composition or compositions, and/or the tie coat composition. Typically, the phenyl acid phosphate is included in the base coat composition, and the phenyl acid phosphate is present in an amount of from about 0.10% to about 0.15% by weight based on the total weight of resin solids of the base coat composition. Likewise, the Lewis acid is present in at least one of the sub-clear coat composition or compositions and/or the tie coat composition. As with the butyl acid phosphate, the Lewis acid is also typically included in the base coat composition, and the Lewis acid is present in an amount of from about 0.01% to about 0.10% by weight based on a total weight of resin solids of the base coat composition.

With reference to the isocyanate hydrolysis retarder/accelerator complex set forth above as suitable for the adhesion promoter, the isocyanate hydrolysis retarder/accelerator complex may be a complex of any of the aforementioned isocyanate hydrolysis retarders and the accelerators set forth above. For example, the isocyanate hydrolysis retarder/accelerator complex may be a mixed phosphorus tin complex. The isocyanate hydrolysis retarder/accelerator complex may be formed prior to mixing into any of the aforementioned compositions that are used to form the respective layers of the coating system in accordance with the embodiments set forth above. However, it is hypothesized that the complex may form by mixing the isocyanate hydrolysis retarder and the accelerator into any of the aforementioned compositions that are used to form the respective layers of the coating system optionally during curing. This is believed to be the case when the phosphorus material and the Lewis acid including tin, both as set forth above, are mixed into any of the aforementioned compositions that are used to form the respective layers of the coating system. It is hypothesized that the isocyanate hydrolysis retarder/accelerator complex may migrate within and between layers in the coating system, ultimately localizing near the interface between the clear coat layer and the sealant, even when the isocyanate hydrolysis retarder/accelerator complex is in the sub-clear coat layer or layers. By localizing near the interface, it is hypothesized that the isocyanate hydrolysis retarder/accelerator complex may function as a super catalyst for the ring-opening reaction of the epoxide, when the component including the epoxide is present in the clear coat composition, to thereby increase a rate at which the protected hydroxyl groups are made available for reaction with the isocyanate component in the sealant composition, as the isocyanate hydrolysis retarder slows the reaction between the isocyanate component in the sealant composition and water. While the exact nature of the isocyanate hydrolysis retarder/accelerator complex is unknown, the phosphorus tin complex, for example, may have a structure similar to known structures such as those having the following general formula:

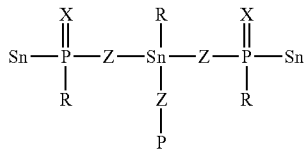

It is to be appreciated that other components may also be present in the clear coat composition, the sub-clear coat composition or compositions and/or the tie coat composition described above and that these compositions are not limited solely to the components described above that are included in the various compositions. Such other components are known in the art.

The clear coat layer and the sub-clear coat layer(s), when present, are typically formed wet-on-wet on the substrate. At least one sub-clear coat layer may be formed on the substrate. For example, the primer layer is typically formed on the substrate, the base coat layer is formed on the primer layer prior to complete curing of the prior composition in the primer layer, i.e., while the primer composition in the primer layer is still wet, and the clear coat layer is typically formed on the base coat layer prior to complete curing of the primer composition in the primer layer and the base coat composition in the base coat layer, i.e., while both the primer composition in the primer layer and the base coat composition in the base coat layer are still wet. Once each of the layers is in place, the layers may then be completely cured through methods that are known in the art. Alternatively, the clear coat layer may be formed directly on the substrate in embodiments in which the sub-clear coat layer(s) are absent from the coating system.

In the embodiments in which the tie coat layer is included in the coating system, the tie coat layer may be formed on the clear coat layer prior to or after complete curing of the clear coat composition in the clear coat layer. Typically, the tie coat layer is formed on the clear coat layer prior to complete curing of the clear coat composition in the clear coat layer to enable the tie coat composition to at least partially integrate into the clear coat composition in the clear coat layer.

The sealant is formed on the clear coat layer. Typically, the sealant is formed on the clear coat layer after the clear coat composition in the clear coat layer and the sub-clear coat composition(s) in the sub-clear coat layer(s), if present, have been completely cured. Alternatively, in some instances, the sealant may be formed on the clear coat layer prior to complete curing of the clear coat layer. When the tie coat layer is present in the coating system, the sealant may be formed over the tie coat layer. However, because the tie coat composition that is used to form the tie coat layer does not include any components that crosslink with the sealant composition or with the clear coat composition, the tie coat composition in the tie coat layer at least partially integrates into the sealant layer and/or the clear coat layer of the coating system to thereby introduce the adhesion promoter contained in the tie coat layer into the other layer(s) of the coating system.

Glass is bonded to the substrate through the coating system and, in particular, through the sealant in the coating system to form an article in accordance with the present invention. Threshold adhesion strength may be achieved between the glass and the substrate through the coating system including the sealant, the clear coat layer, and the sub-clear coat layer(s) when the adhesion promoter is included in the clear coat composition and at least one of the sub-clear coat composition(s), the tie coat composition, and the sealant composition according to the parameters set forth above. By threshold adhesion strength, it is meant adhesion between the glass and the substrate that satisfies MVSS 212. The threshold adhesion strength is typically achieved at a thickness of the clear coat layer of at least 0.7 mils. Notably, the threshold adhesion strength may be achieved in the absence of a reactive primer applied between the sealant and the clear coat layer. Such systems are commonly referred to in the art as primerless systems, and MVSS adhesion that is achieved without the use of such reactive primers is commonly referred to as primerless MVSS adhesion.

In laboratory studies, plaques are typically prepared including the coating system with the sealant, the clear coat layer, and the optional tie coat layer and/or sub-clear coat layer(s). The clear coat layer is formed in a wedge of gradually decreasing thickness. Adhesion strength between glass and the sealant is typically known, and it is the adhesion between the sealant and the clear coat layer that is typically the weakest point in the bond between the glass and the substrate. Therefore, the bond between the sealant and the clear coat layer is tested by pulling the sealant from the clear coat layer and observing the thickness of the clear coat layer at a point where the sealant can no longer be manually pulled from the clear coat layer, which is deemed a "minimum passing thickness". Lower minimum passing thicknesses of the clear coat layer correlate to better adhesion strength between the sealant and the clear coat layer, with threshold adhesion strength typically achieved when the sealant can no longer be manually pulled from the clear coat layer at a thickness of the clear coat layer of about 0.8 mils. Although the targeted clear coat layer thickness is 2.0 mils, it is desirable that adequate adhesion strength is achieved as low as 0.5 mil of clear coat. Although the targeted sub-clear coat layer thickness (in this case, the base coat layer) is 0.5-1.0 mil, it is desirable that adequate adhesion strength is achieved as high as 2.0 mils of the base coat layer. It is most desirable when adequate adhesion strength is achieved with 2.0 mils of the base coat layer and 0.5 mil of the clear coat layer. Of course, it is to be appreciated that the thickness of the sub-clear coat layer(s) necessary to achieve MVSS adhesion between the sealant and the clear coat layer may vary depending upon whether or not the adhesion promoter is divided between other compositions in the coating system, such as the tie coat composition.

When the tie coat layer is included in the coating system, the minimum passing thickness of the clear coat layer, as set forth above, still applies. To enable achievement of MVSS adhesion when the adhesion promoter is included in the tie coat composition, the tie coat layer typically has a thickness of from about 0.001 to about 0.30 mils, most typically from about 0.01 to about 0.10 mils. Of course, it is to be appreciated that the thickness of the tie coat layer necessary to achieve MVSS adhesion between the sealant and the clear coat layer may vary depending upon whether or not the adhesion promoter is divided between other compositions in the coating system, such as the sub-clear coat composition or compositions. Typical thicknesses of the sealant are from about 1 to about 25 mm, more typically from about 5 to about 10 mm.

The following examples are meant to illustrate, and not to limit, the present invention.

EXAMPLES

Coating systems can be prepared including a clear coat layer and a base coat layer on a primed steel panel for purposes of illustrating adhesion between the clear coat layer and the sealant within the coating system. The based coat compositions that are used were based on a blue metallic high solids solvent borne base coat, code E87BU083L, commercially available from BASF Coatings, and were modified as follows.

Base coat 1—unmodified for use as a comparative example.

Base coat 2—modified with 0.10 wt % butyl acid phosphate (commercially available from Rhodia) based on total base coat weight.

Base coat 3—modified with 0.10 wt % butyl acid phosphate and 0.12 wt % dibutyltin diacetate (available from Atofina).

Base coat 4—modified with 1.0 wt % Nacure 9250, which is a zinc chelate commercially available from King Industries.

Base coat 5—modified with 0.07 wt % butyl acid phosphate and 0.14 wt % bismuth octoate commercially available from King Industries.

Basecoat 6—modified with 0.10% butyl acid phosphate and 1.0% Nacure 9250.

The clear coat compositions that were used are as follows:

Clear coat 1—R10CG075, a carbamate-melamine crosslinked clear coat containing an epoxy resin and further containing a Lewis acid as described in U.S. Pat. No. 5,639,828 to Briggs et al. and commercially available from BASF Coatings.

Clear coat 2—R10CG060N4 batch 101963575, a carbamate-melamine crosslinked clear coat containing an epoxy resin and further containing a Lewis acid as described in U.S. Pat. No. 5,639,828 to Briggs et al. and commercially available from BASF Coatings.

Clear coat 3—Clear coat 2 modified with 1.0 wt % Nacure 9250.

To prepare the coating system, the base coat layer is formed on a primed steel panel, with the base coat layer having a dry thickness of 1.5 mils. The base coat layer is flashed for at least 5 minutes at room temperature before forming a clear coat layer thereon. The clear coat layer was then formed on the base coat layer in a wedge, with the clear coat layer having a dry thickness of from 0.1 to 2.0 mils. The panels with the clear coat layer and the base coat layer are then flashed for a period of at least 10 minutes at room temperature, and baked for 10 minutes at 275° F. metal temperature.

After removing the panels including the clear coat layer and the base coat layer from the oven, the panels are allowed to age overnight before forming the sealant on the clear coat layer, which is Betaseal® 57302 urethane windshield adhesive commercially available from Dow Automotive. A bead of the sealant composition is applied along the direction of the clear coat wedge. The sealant is allowed to cure for 72 hours at 50% RH and 75° F. After curing, the sealant is pulled from the panel. The sealant has weak adhesion at low clear coat film builds, and at some point along the wedge of clear coat layer, good adhesion is achieved. Good adhesion, as used herein, is adhesion that is high enough such that the sealant can no longer be manually pulled from the panel. The minimum clear coat thickness required to achieve good adhesion is recorded and is set forth below in Table 1, with lower values for the thickness of the clear coat layer indicating better adhesion.

TABLE 1

| Base coat composition | Clear coat composition | Minimum clear coat film thickness to achieve good adhesion, mils |
|---|---|---|
| 1 | 1 | 1.0 |
| 2 | 1 | 0.3 |
| 3 | 1 | 0.1 |
| 1 | 2 | 1.4 |
| 2 | 2 | 0.8 |
| 3 | 2 | 0.6 |
| 4 | 2 | 1.0 |
| 5 | 2 | 1.1 |
| 6 | 2 | 0.8 |
| 1 | 3 | 0.9 |

As is evident from Table 1 above, addition of an accelerator (Nacure 9250) alone, to either the base coat composition or clear coat composition, has a positive effect on windshield adhesion as shown by base coat 4 and clear coat 3, respectively. However, with particular focus on the Examples in which base coat composition 3 is used, addition of an accelerator (dibutyltin diacetate) and an isocyanate hydrolysis retarder (butyl acid phosphate) to the base coat composition has a synergistic effect on windshield adhesion between the clear coat layer and the sealant of the coating system.

The invention has been described in an illustrative manner, and it is to be appreciated that the terminology which has been used is intended to be in the nature of words of description rather than of limitation. Obviously, many modifications and variations of the present invention are possible in view of the above teachings. It is, therefore, to be appreciated that within the scope of the claims the invention may be practiced otherwise than as specifically described.

What is claimed is:

1. A coating system comprising:
   a clear coat layer formed from a clear coat composition comprising:
   a crosslinkable carbamate-functional resin;
   an aminoplast comprising the reaction product of an aldehyde and a melamine; and
   a first adhesion promoter comprising an isocyanate hydrolysis retarder comprising a phosphate ester and an accelerator comprising a Lewis acid, wherein said first adhesion promoter is present in said clear coat composition in an amount of less than or equal to about 3% by weight based on the total weight of resin solids of said clear coat composition;
a base coat layer having a thickness of 2 mils bonded to said clear coat layer and formed from a base coat composition comprising:
a base coat resin;
a second crosslinking agent; and
a second adhesion promoter comprising a second isocyanate hydrolysis retarder and a second accelerator, wherein said second adhesion promoter may be the same as or different than said first adhesion promoter of said clear coat composition;
a sealant bonded directly to said clear coat layer and free of a reactive primer disposed therebetween, said sealant formed from a sealant composition comprising an isocyanate component and an isocyanate-reactive component;
wherein said second adhesion promoter is present in said base coat composition in an amount of at least 0.05% by weight based on a total weight of resin solids of said base coat composition to increase adhesion between said clear coat layer and said sealant.

2. The coating system as set forth in claim 1 wherein said second accelerator is present in said base coat composition in an amount of at least about 0.01% by weight based on a total weight of resin solids of said base coat composition.

3. The coating system as set forth in claim 2 wherein said second accelerator comprises a Lewis acid.

4. The coating system as set forth in claim 2 wherein said second isocyanate hydrolysis retarder is present in said base coat composition in an amount of at least 0.01% by weight based on a total weight of resin solids of said base coat composition.

5. The coating system as set forth in claim 4 wherein said second isocyanate hydrolysis retarder comprises a phosphorus material.

6. The coating system as set forth in claim 1 wherein said second adhesion promoter comprises butyl acid phosphate.

7. The coating system as set forth in claim 6 wherein said butyl acid phosphate is present in said base coat composition in an amount of from about 0.05% to about 0.10% by weight and said Lewis acid is present in said base coat composition in an amount of from about 0.01% to about 0.15% by weight based on a total weight of resin solids of said base coat composition.

8. The coating system as set forth in claim 1 wherein the crosslinkable carbamate-functional resin and the aminoplast are present in an amount sufficient to produce urethane bonds resulting from carbamate cure with aminoplast in an amount of at least about 10% based on a total crosslink density in said clear coat layer.

9. The coating system as set forth in claim 1 wherein the clear coat composition further comprises a component including at least one epoxide group.

10. The coating system as set forth in claim 9 wherein the component including at least one epoxide group is substantially free of groups that are reactive with the carbamate-functional resin and the aminoplast.

11. The coating system as set forth in claim 1 which is a wet on wet system wherein said clear coat layer is formed on said base coat layer prior to complete curing of said base coat layer.

12. The coating system as set forth in claim 1 wherein said clear coat layer and said base coat layer are completely cured prior to forming said sealant upon said clear coat layer.

13. An article comprising a glass bonded to said sealant and a substrate bonded to said coating system opposite said sealant of said coating system set forth in claim 1.

14. The article as set forth in claim 13 having threshold adhesion strength between said glass and said substrate at a thickness of said clear coat layer of less than or equal to about 0.8 mils.

15. A method of preparing the coating system of claim 1, said method comprising the steps of:
forming at least one of the base coat layer on a substrate;
forming the clear coat layer on the at least one base coat layer; and
forming the sealant on the clear coat layer.

16. A coating system comprising:
a clear coat layer formed from a clear coat composition comprising:
a crosslinkable carbamate-functional resin;
an aminoplast comprising the reaction product of an aldehyde and a melamine; and
a first adhesion promoter comprising an isocyanate hydrolysis retarder comprising a phosphate ester and an accelerator comprising a Lewis acid, wherein said first adhesion promoter is present in said clear coat composition in an amount of less than or equal to about 3% by weight based on the total weight of resin solids of said clear coat composition;
a base coat layer having a thickness of 2 mils bonded to said clear coat layer and formed from a base coat composition comprising:
a base coat resin;
a second crosslinking agent; and
a second adhesion promoter comprising a second isocyanate hydrolysis retarder and a second accelerator, wherein said second adhesion promoter may be the same as or different than said first adhesion promoter of said clear coat composition;
a sealant bonded to said clear coat layer and free of a reactive primer disposed therebetween, said sealant formed from a sealant composition comprising an isocyanate component and an isocyanate-reactive component, and
a tie coat layer disposed between said clear coat layer and said sealant, said tie coat layer formed from a tie coat composition comprising a third adhesion promoter which may be the same as or different than said first and second adhesion promoters;
wherein said third adhesion promoter is present in said tie coat composition, and said second adhesion promoter is present in said base coat composition in an amount of at least 0.05% by weight based on a total weight of resin solids of said base coat composition to increase adhesion between said sealant and said clear coat layer.

17. The coating system as set forth in claim 16 wherein a third isocyanate hydrolysis retarder is present in said tie coat composition in an amount of at least 0.2% by weight based on a total weight of all components present in said tie coat composition.

18. The coating system as set forth in claim 17 wherein said third isocyanate hydrolysis retarder is present in said tie coat composition in an amount of at least 0.02% by weight based on a total weight of all components present in said tie coat composition.

19. The coating system as set forth in claim 18 wherein said third isocyanate hydrolysis retarder comprises a phosphorus material.

20. The coating system as set forth in claim 16 wherein a third accelerator is present in said tie coat composition in an amount of at least about 0.3% by weight based on a total weight of all components present in said tie coat composition.

21. The coating system as set forth in claim 20 wherein said third accelerator comprises a Lewis acid.

22. The coating system as set forth in claim 16 wherein said third adhesion promoter comprises butyl acid phosphate and a Lewis acid.

23. The coating system as set forth in claim 16 wherein said clear coat composition further comprises a component including at least one epoxide group.

* * * * *